United States Patent [19]

Holdenried

[11] Patent Number: 5,067,362
[45] Date of Patent: Nov. 26, 1991

[54] CONTROL DEVICE

[75] Inventor: Willy Holdenried, Immenstaad, Fed. Rep. of Germany

[73] Assignee: Zahnradfabrik Friedrichshafen AG, Friedrichshafen, Fed. Rep. of Germany

[21] Appl. No.: 445,843

[22] PCT Filed: May 18, 1988

[86] PCT No.: PCT/EP88/00424
§ 371 Date: Nov. 22, 1989
§ 102(e) Date: Nov. 22, 1989

[87] PCT Pub. No.: WO88/09452
PCT Pub. Date: Dec. 1, 1988

[30] Foreign Application Priority Data

May 27, 1987 [DE] Fed. Rep. of Germany ....... 3717935

[51] Int. Cl.[5] .............................................. F16H 5/36
[52] U.S. Cl. .................................... 74/335; 74/473 R
[58] Field of Search ................. 74/331, 333, 334, 335, 74/471 R, 473 R, 480 R

[56] References Cited

U.S. PATENT DOCUMENTS

| 2,582,895 | 1/1952 | Young | 74/745 |
| 3,757,598 | 9/1973 | Van Dest | 74/473 R |
| 4,483,210 | 11/1984 | Mayuzumi | 74/473 R X |
| 4,590,817 | 5/1986 | Bennett | 74/473 R |
| 4,905,530 | 3/1990 | Stehle et al. | 74/335 |

FOREIGN PATENT DOCUMENTS

| 0071353 | 2/1986 | European Pat. Off. . |
| 0122014 | 5/1986 | European Pat. Off. . |
| 0052794 | 6/1986 | European Pat. Off. . |
| 1951428 | 10/1969 | Fed. Rep. of Germany . |

Primary Examiner—Allan D. Herrmann
Assistant Examiner—William O. Trousdell
Attorney, Agent, or Firm—Herbert Dubno

[57] ABSTRACT

A standard H transmission set with a manual shifting lever has affixed to the gear box a servocontrol unit which allows shifting between road, travel, farm operation and reverse groups so that the full range of manual selection is available in each of these groups utilizing a selector on the handle of the gear-shift lever which operates solenoid valves controlling servovalves all of which are built into the servocontrol casing.

11 Claims, 5 Drawing Sheets

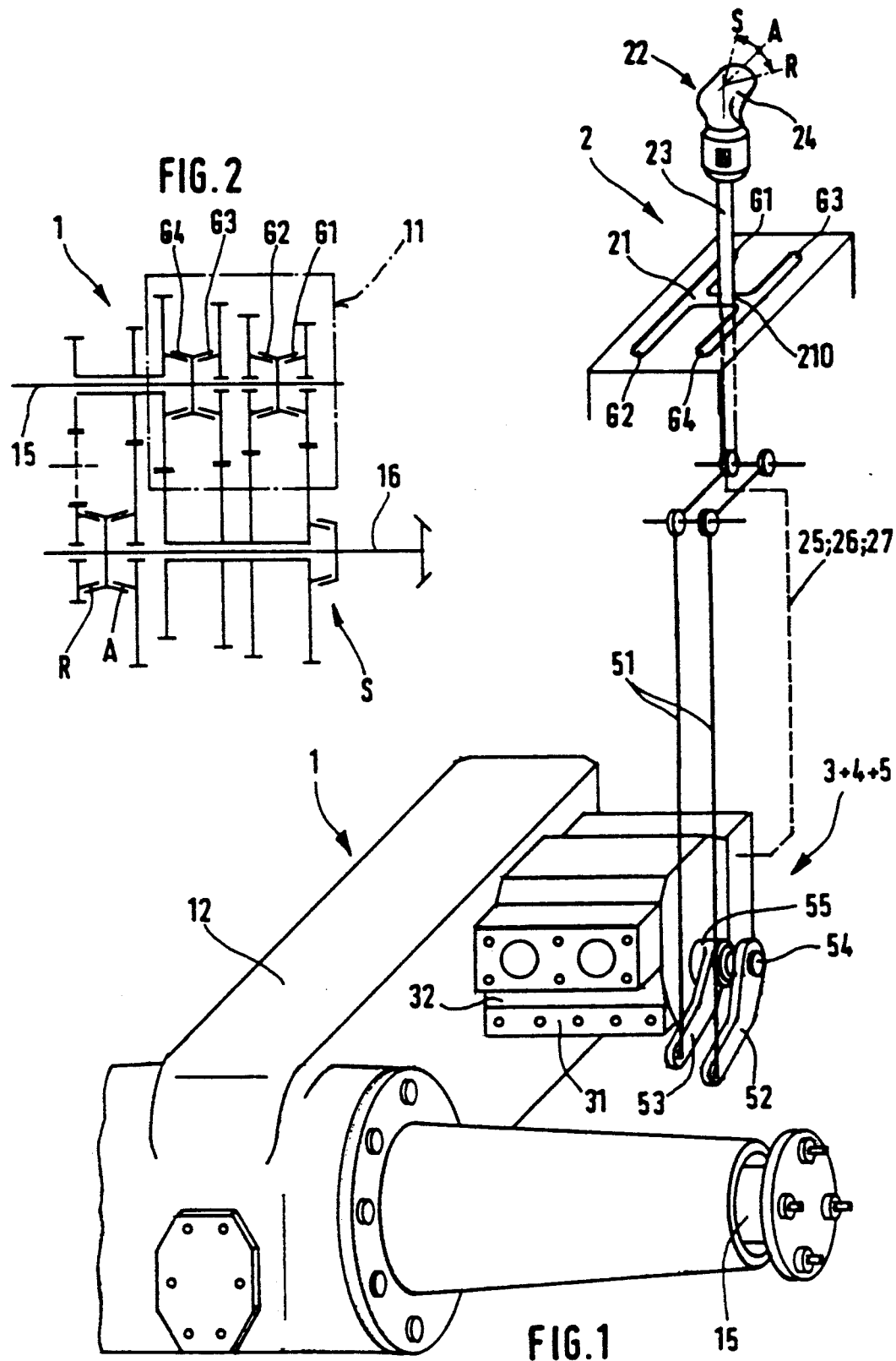

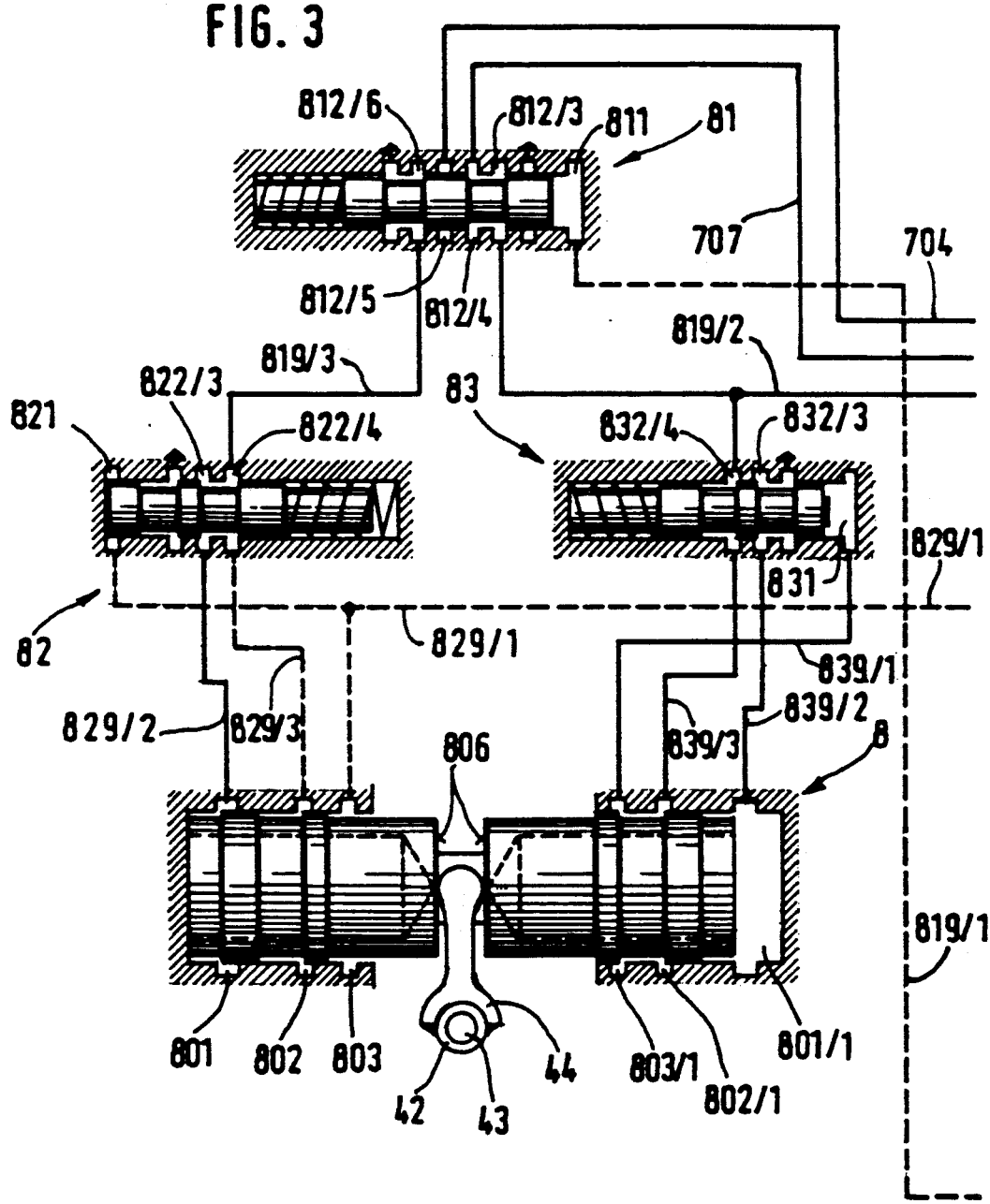

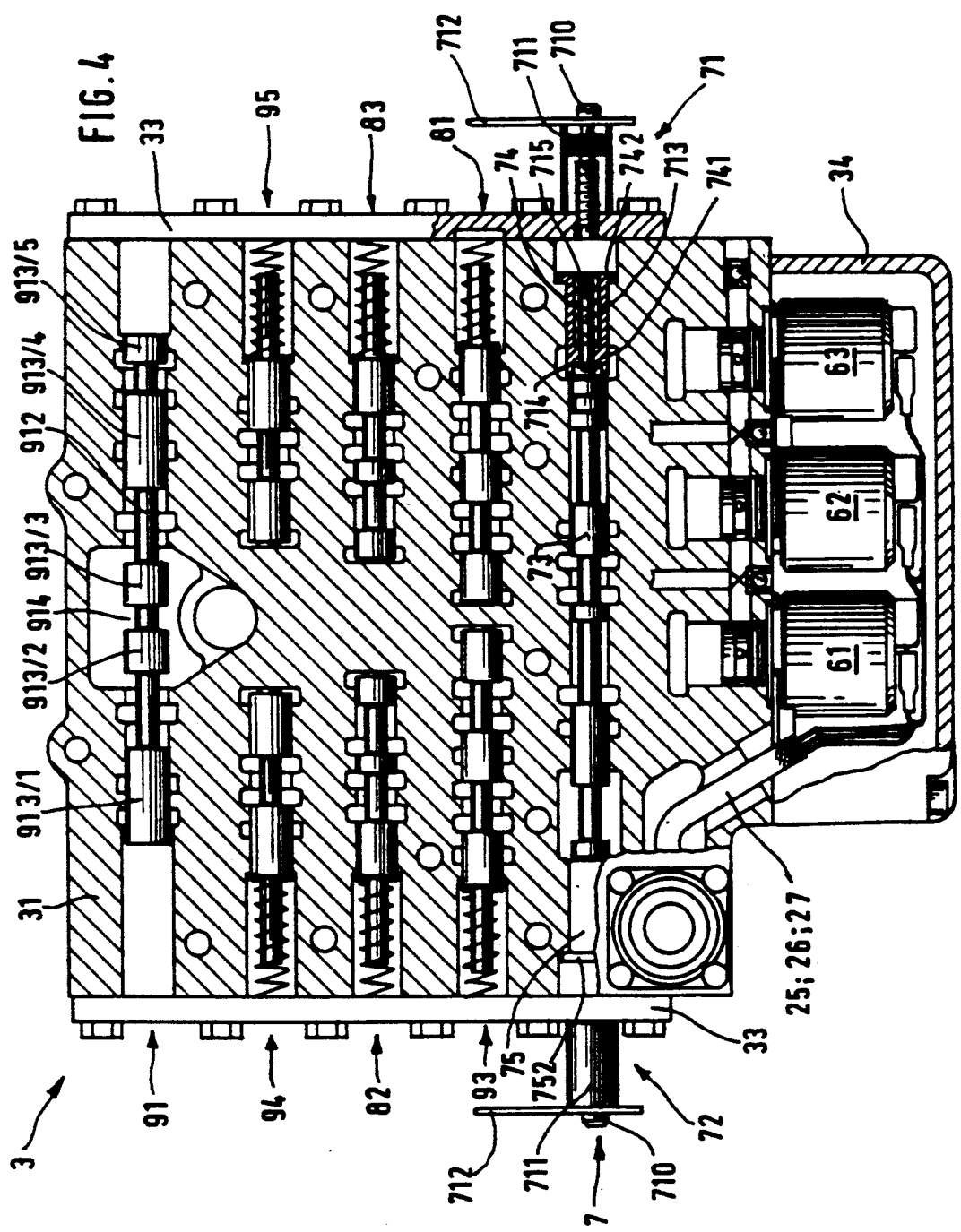

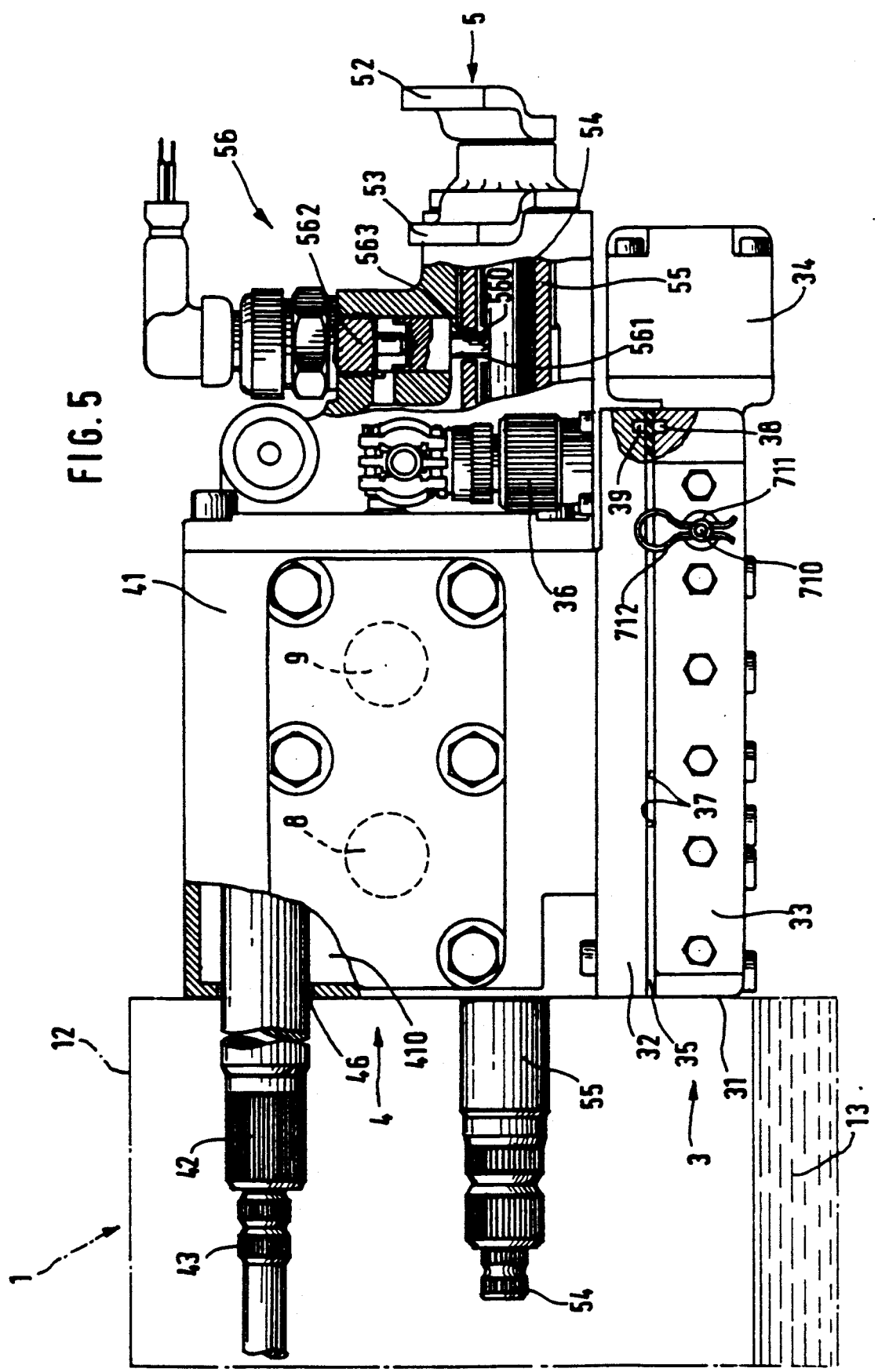

CONTROL DEVICE

CROSS REFERENCE TO RELATED APPLICATIONS

This application is a national phase of PCT/EP88/00424 filed 18 May 1988 and based in turn on German application P37 17 935.7 filed 27 May 1987 under the International Convention

FIELD OF THE INVENTION

The invention relates to a control device for a gearbox of group design. More particularly the invention relates to a transmission of group design, primarily for a farm tractor, wherein at least the gears of a standard transmission are changed mechanically by hand according to a standard H shifting pattern and an additional shifting is effected in two forward drive groups and one reverse drive group.

BACKGROUND OF THE INVENTION

Such a device is known from EP 00 52 794. As shown in FIG. 3 of this patent specification, four gears of the standard transmission are shifted mechanically by hand with the manual shift lever 20 from the gearbox according to an H pattern.

Furthermore, via a second gear-shift lever 40, the shifting of two drive gear groups and one reverse drive group takes place.

Such devices, or as shown in FIGS. 1 and 2, with a gear splitting that can be shifted up or down under load of the gears 1 to 4, have proven to be successful in farm tractors.

However, the mechanical two-lever shifting has high space requirements in the driver's cabin, and generally does not satisfy the demands imposed on modern from tractors.

OBJECTS OF THE INVENTION

It is therefore an object of the present invention to provide a control device for a transmission of the aforedescribed type with the simplest possible means.

Another object is to provide such a control system which requires no intervention in the gearbox and which permits the gears of the main gearbox to continue to be shifted mechanically so that it is possible to equip already existing farm tractors with the device.

SUMMARY OF THE INVENTION

This object is attained, according to the invention, in that a road travel gear group (S) and a farming operation group (A), as well as a reverse group (R) are engaged by means of a servo control on the manual gear lever for the gears in the standard transmission.

A gear-shift mechanism is arranged on the gearbox, this mechanism consisting of an electro-hydraulic control unit, a power-assisted servo control for shifting the groups and a transmission system for the gears in the basic transmission shifted manually according to an H-type shifting pattern.

Advantageously the servo control has solenoid valves, and a selector slide is permanently connected with a pressure source and is displaced by the pressure medium into two respective end positions and one middle position. For each position of the servo control and for each position of the selector slide, one of the solenoid valves is assigned. Via the three-position selector slide, a two-position shifting piston for the engagement and disengagement of the road travel group (S) and a three-position shifting piston for the farming operation group (A) and a reverse group (R), as well as a middle- and a zero-position are shifted via a control valve and a shift lever.

A pressure-cutoff valve is assigned to each end position of the two-position shifting piston which also has a command slide valve assigned to it.

To the three-position shifting piston, a command slide valve is assigned and to each end position, a pressure-cutoff valve can be assigned. For venting both piston spaces in the middle position both two-way valves are shifted.

Due to the single-lever shifting, the space requirements in the driver's cabin are reduced and the entire shifting operation is considerably simplified, since the driver need no longer reach from one gearshift lever to the other, in various driving situations. In addition, the shifting of the groups is facilitated. As a result of the combination in one shifting mechanism of all the elements involved in the power-assisted shifting of the groups and the manual shifting of the basic transmission, a simplification of the shifting arrangement results and there is no change in the gearbox, so that transmissions equipped with a purely manual gearshift can be quickly and simply retrofitted. For this purpose, only the two flanged servo-controls have to be replaced by a gear-shift mechanism, and the console in the driver's cab has to be exchanged. The electric and hydraulic connections of the gearshift mechanism can be achieved over flexible lines and the actuation connections for the mechanical shifting by hand can basically remain unchanged and therefore are easily connectable. In order to minimize the overall dimensions, for the shifting of the three transmission groups, only two shifting pistons are provided in the gear-shifting mechanism and all the slide valves and other valves, including the solenoid valves, are arranged in one electrohydraulic control unit, with a control-unit case and a cover designed as a channel plate for the pressure ducts. As a result, besides the compact construction of the entire gearshift mechanism, the oil or pressure ducts in the cover of the control-unit case are very short. Due to a sealing plate provided between the control-unit case and the cover in connection with a relief channel in each of the two—control-unit case and cover—an additional oil pan, such as known in control-unit cases of automatic transmissions, can be dispensed with. When the piston spaces of the shifting pistons in the gearshift mechanism cannot be voided in the vented state due to the high oil level, short shifting times can be achieved during gear shifting, since the relatively large piston spaces which are necessary because of the required shifting forces, do not have to be refilled first. Also, another simplification is that the oil sump of the transmission can be simultaneously used for the flanged gearshift mechanism, via an enlarged passage opening for one of the rotary shafts, since in this case a separate return duct can be eliminated.

In case of electrical failure, to the emergency actuation accessible from the outside, it is possible to mechanically-hydraulically engage the drive gear in the road travel group and the reverse gear, via respective devices. If required, the farming gear set can also be engaged through a definite actuation of both emergency devices. By mounting a simple starter safeguard on the gearshift mechanism, a further simplification results, and in addition the switch is easily accessible.

BRIEF DESCRIPTION OF THE DRAWING

The above and other objects, features and advantages of the present invention will become more readily apparent from the following description, reference being made to the accompanying drawing in which:

FIG. 1 is a perspective view of a gear-changing device with shifting console in the driver's cabin and a gearshift mechanism on the gearbox;

FIG. 2 schematic representation of the speed-changing gearbox;

FIGS. 3 and 3A are control diagrams for the shifting of the groups;

FIG. 4 is a section through the control-unit case of the electro-hydraulic control unit; and FIG. 5 is an elevational view of the gearshift mechanism partially broken.

SPECIFIC DESCRIPTION

Figure 3A:
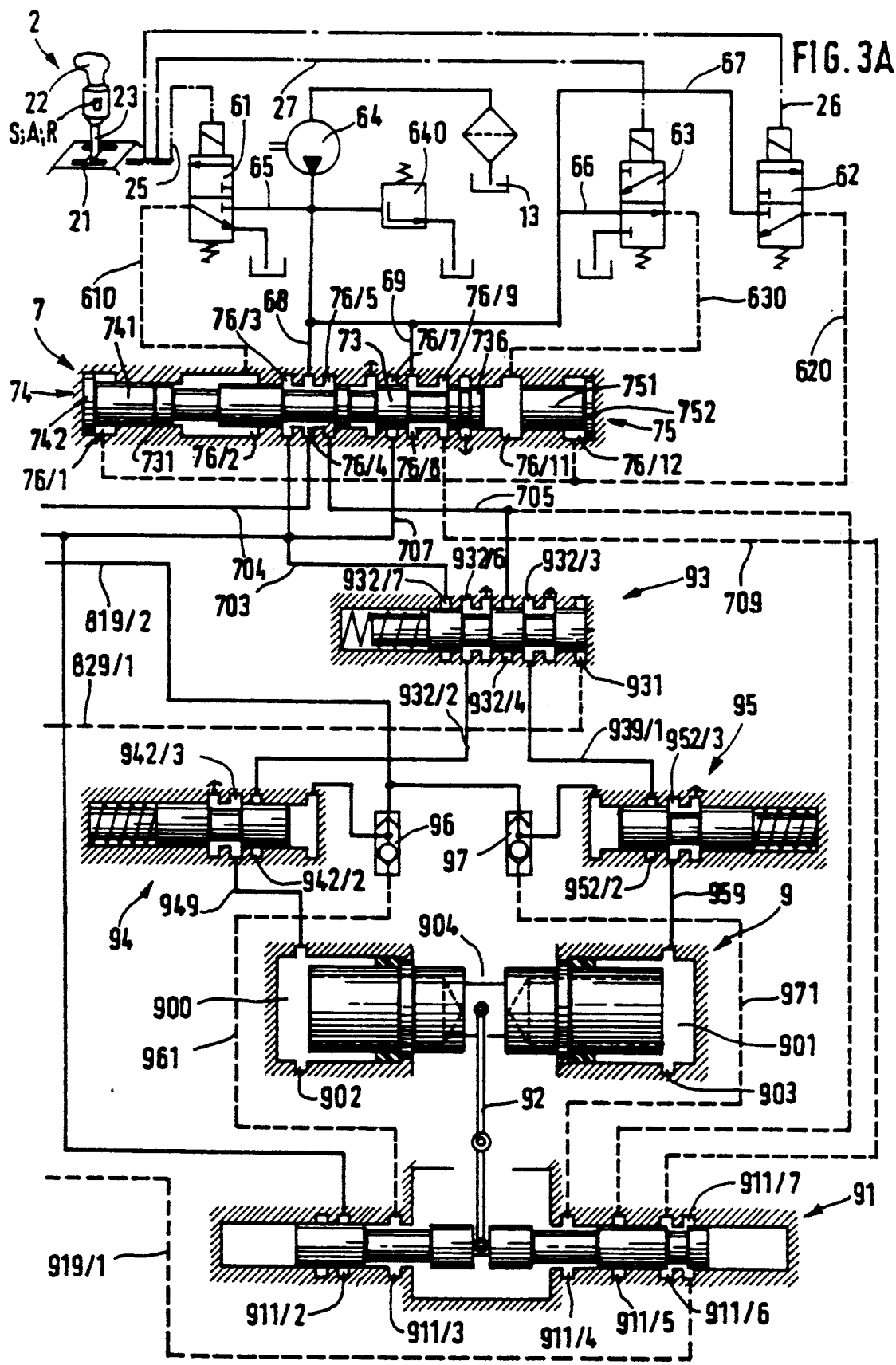

FIG. 1 shows the shifting console 2 with the manual gear lever 23, arranged in the driver's cab, as well as the gear-changing device 1 directly connected with a drive axle 15, as well as a gearshift mechanism 3+4+5 flanged thereon. The manual gear-shift lever 23 for the mechanical shifting of the speeds in the basic transmission 11 is shiftable in the gear-shifting gate 21 according to an H-pattern, from the neutral position 210 in the paths of the gears G1/G2; G3/G4 and in the gears themselves. For this purpose the manual gear lever 23 is connected in a known manner, via for instance transmission rods 51, with the transmission system 5. In this example, two levers 52, 53, which are rigidly connected with a shaft 54 and a hollow shaft 55 and two rods 51, assigned to the paths G1/G2; G3/G4, are represented.

On the manual gear lever 23 in the area of the handle 24, a servo-control 22 for the shifting of the transmission groups is also provided. By turning the handle—which due to mechanical locking can be performed only in the neutral position 210 of the gear lever 23 the farming operation group A, the road travel group S and the reverse group R can be actuated (selected), via for instance an electrical switch, through three solenoid valves located in the control-unit case 31, whereby one solenoid valve is assigned to each group. This prevents a surprise shifting of the transmission groups, in case of power failure.

In the schematic representation of the gearbox 1 according to FIG. 2, in the area of the basic transmission 11 the clutches of the gears G1 to G4, which are shifted in a known manner over the gear lever 23, are discernible. The power-assisted clutches for group shifting are marked R, A and S. The drive shaft 15 and the driven shaft 16 have also been shown.

In the control diagram according to FIG. 3, FIG. 3A, the servo-control 22 on the gearshift console is connected in accordance with the shift positions S=road travel, A=farming operation, R=reverse, via electric leads 25, 26, 27 with corresponding solenoid valves 61, 62, 63, each moving a selector slide 7 in a middle position and in two respective end positions. For this purpose, a pressure-medium source, pump 64, drawing the pressure medium from a return receptacle, sump 13 of the gearbox case 12, in FIG. 2, is provided with a pressure-relief valve 640. The pump is connected via ducts 65, 66, 67 with the solenoid valves 61, 62, 63 and via ducts 68, 69 directly with the fourth and eighth annular spaces 76/4, 76/8 of the selector slide or spiral valve 7. The duct 620 leads from the solenoid valve 62 to the two outer annular spaces 76/1 and 76/12, the duct 610 leads form the solenoid valve 61 to the second annular space 76/2, and the duct 630 leads from the solenoid valve 63 to the eleventh annular space 76/11. The selector slide valve 7 has a central spool 73 with six plungers 731 to 736 and five recesses of various length arranged between the plunger 5, as well as two external spools 74, 75, each with only one plunger 741, 751 and one collar 742, 752, reaching into the outer annular spaces 76/1 and 76/12. When the selector slide valve 7 is in the median position, a three-position shifting piston 9 is pushed into the left end position by a control valve 91 and a shift lever 92, and a two-position shifting piston 8 (FIG. 3) is directly pushed into the open position (right end position). The median position of the three-position shifting piston 9 is associated with the left end position of the selector slide 7 and the two-position shifting piston 8 is brought into the engaged position- left end position. In the right end position of the selector slide 7, the three-position shifting piston is also brought into the right end position by the pressure medium, and the two-position shifting piston 8 has already earlier been moved into the open position—right end position. Immediately after the displacement of the shifting pistons 8, 9, their pressure spaces are vented. For shifting and venting, in connection with the two-position shifting piston 8, a command slide valve 81 and two pressure-cutoff valves 82, 83 are provided, and in connection with the three-position shifting piston 9, the control valve 91 connected therewith via shift lever 92, a command slide valve 93, as well as two pressure-cutoff valves 94, 95 and thereto assigned two-way valves 96, 97 are provided. Between the selector slide 7 and the control valve 91, the command slide valves 81, 93, pressure-cutoff valves 82, 83, 94, 95 and two-way valves 96, 97 and the shifting pistons 8, 9 and between each other, the following connections exist over the pressure ducts:

duct 703 from the third annular space 76/3 and duct 707 from the seventh annular space 76/7 of the selector slide 7 to the seventh annular space 932/7 of the command slide valve 93, to the fourth annular space 812/4 of the command slide valve 81 and to the second annular space 911/2 of the control valve 91;

duct 704 from the fourth annular space 76/4 of the selector slide 7 to the fifth annular space 812/5 of the command slide valve 81;

duct 705 from the fifth annular space 76/5 of the selector slide 7 to the fourth annular space 932/4 of the command slide valve 93 and the fifth annular space 991/5 of the control valve 91;

duct 709 from the ninth annular space 76/9 of the selector slide 7 to the sixth annular space 911/6 of the control valve 91;

duct 819/1 from the first frontal annular space 811 of the command slide valve 81 to the seventh annular space 911/7 of the control valve 91;

duct 829/1 from the first frontal annular space 821 of the pressure-cutoff valve 82 to the first frontal annular space 931 of the command slide valve 93 and the third left-side annular space 803 of the shifting piston 8;

duct 819/2 from the third annular space 812/3 of the command slide valve 81 to the fourth annular space 832/4 of the pressure-cutoff valve 83 and to each of a lateral inlet of both two-way valves 96, 97;

duct 819/3 from the sixth annular space 812/6 of the command slide valve 81 to the fourth annular space 822/4 of the pressure-cutoff valve 82;

duct 829/2 from the third annular space 822/3 of the pressure-cutoff valve 82 to the first left-side annular space 801 of the shifting piston;

duct 829/3 from the fourth annular space 822/4 of the pressure-cutoff valve 82 to the second left-side annular space 802 of the shifting piston 8;

duct 839/1 from the first frontal annular space 831 of the annular space 803/1 to the third right-side annular space 803/1 of the shifting piston 8;

duct 839/2 from the third annular space 832/3 of the pressure-cutoff valve 83 to the first right-side annular space 801/1 of the shifting piston 8;

duct 839/3 from the fourth annular space 832/4 of the pressure-cutoff valve 83 to the second right-side annular space 802/1 of the shifting piston 8;

duct 939/1 from the third annular space 932/3 of the command slide valve 93 to the second annular space 952/2 of the pressure-cutoff valve 95;

duct 939/2 from the sixth annular space 932/6 of the command slide valve 93 to the second annular space 942/2 of the pressure-cutoff valve 94;

duct 961 from a lateral inlet of the two-way valve 96 to the third annular space 911/3 of the control valve 91;

duct 971 from a lateral inlet of the two-way valve 97 to the fourth annular space 911/4 of the control valve 91;

duct 949 from the third annular space 942/3 of the pressure-cutoff valve 94 to the left annular space 902 of the shifting piston 9; and duct 959 from the third annular space 952/3 of the pressure-cutoff valve 95 to the right angular space 903 of the shifting piston 9.

A lever 44 rigidly connected to a hollow shaft 42 engages in groove 806 on the shifting piston 8, so that when the shifting piston is displaced, the hollow shaft is rotated in a definite manner into two end positions.

Besides the shift lever 92, another lever not shown in the drawing engages in the groove 904 of the shifting piston 9, so that when the three-position piston 9 is displaced, the shaft 43 is rotated into three defined positions, whereby the two extreme positions correspond to the farming-operation group A and the reverse group R.

In the control-unit case 31 of the electro-hydraulic control unit 3, according to FIG. 4, the solenoid valves 61, 62, 63, as well as the selector slide 7, the control valve 91 and the command slide valves 81, 93 and the pressure-cutoff valves 82, 93, 94, 95 are arranged.

The shift lever 92 shown in FIG. 3A engages in the groove 914 in the sleeve valve 912, between the plungers 913/2 and 913/3. On the selector slide 7, on both sides, the mechanically acting emergency actuators 71, 72 are also provided. With their help it is possible to shift the selector slide 7, in case of power failure or of failure of the solenoid valves. Coaxially with the selector slide 7, on each of the two sides in the cover 33, a positioning screw 710 is mounted, which by means of a sleeve 711 an a safety lock 712 is secured against unintentional turning. Furthermore, the mechanical emergency device comprises transmission pins 713 one for each of the positioning screws, the pins being held frontally flush by a second safety lock 714 against the action of a spring 715 in an offset bore of the respective outer sleeve valve 74, 75. By means of these two devices 71, 72 triggering the emergency actuation, the middle sleeve valve 73 can be brought into the middle position—which corresponds to shifting into the farming-operation group—when the two positioning screws push the extreme sleeve valves 74, 75 to stop against collars 742, 752 thereof. In order to shift to the road travel group S or to the reverse group R, it is only necessary to release the safety lock 712 and to turn one positioning screw until it stops. Thereby, first the associated extreme sleeve valve has to be displaced, as described, until it stops against the collar 742, 752, and, by further turning the positioning screw 710, the transmission pin 713 presses the middle sleeve valve 74, 75 into the respective end position, wherein the collar 742, 752 rests on the cover plate 33. In this way, all three groups A, S, R can be engaged selectively in an emergency.

The gearshift mechanism according to FIG. 5, which is flanged on the gearbox case 12, comprises the electro-hydraulic control unit 3, the servo control 4 and the transmission system 5 for the mechanical shifting of the gears. As shown in FIG. 4, the solenoid valves are protected by a cover 34. In the cover 32, all the ducts shown in FIG. 3 are incorporated as channels, as well as both two-way valves 96, 97, and are covered by a sealing plate 35, provided between the control-unit case 31 and the cover 32. In the case 41 of the servo control 4, the shifting pistons 8, 9 with the hollow shaft 42 and the shaft 43 are located. The sliding motion of the shifting pistons 8, 9 is converted into a rotary motion of the hollow shaft 42 and the shaft 43 by a corresponding lever, for instance 44 in FIG. 3, engaging respectively in the grooves 806 and 904 of these shifting pistons. The shafts extend into the gearbox case 12 and shift directly via a corresponding lever or via push rods the associated clutches R, A and S, according to FIG. 2. In the case 41 of the servo control, the transmission system 5 is also located, which over two levers 52, 53, transmits the shifting motion coming from the transmission rods 51 for the gears G1 to G4, via the hollow shaft 55 and the shaft 54, to the clutches G1 to G4. In connection with the hollow shaft 55 and the shaft 54, an electrical-mechanical starter safeguard 56 is also provided. For this purpose, on the shaft 54 a surface 560 is provided and in the same plane, the hollow shaft 55 is slotted—slot 561—up to this surface. A sensor 563 cooperating with a switch 562 is located in slot 561 and in the neutral position 210 of the shift lever 23 extends into the slot up to the surface 560, since both levers 52, 53 are in the middle position. If a gear G1 to G4 is selected, either the shaft 54 or the hollow shaft 55 turns, so that the sensor 563 is lifted and the switch 562 is actuated. In this way, it can be turned on only when no gear is selected and the shift lever 23 is in the neutral position 210. A plug marked 36 serves for the connection of the electrical leads 25, 26, 27 from the shifting console 2 with the solenoid valves 61, 62, 63. At a defined distance from the outer edge, on the sealing surface 37, circularly running relief channels 38, 39 coming from the control-unit case 31 and from the cover 32 are provided, which have a connection to the inner space 410 of the gearbox case, collect the leaked oil and discharge it into this inner space. The entire inner space and also the vented pressure spaces of the shifting pistons are filled with oil, because the overflow passage 46 to the sump 13 is placed very high up, for instance in the form of an enlarged passage opening for the hollow shaft 42.

I claim:

1. A transmission system, especially for farm tractors, comprising:

a transmission shiftable in a standard H pattern connectable between an input shaft and an output shaft;

first gearing means forming a road travel group between said shafts for coupling said shafts with each other through said transmission with a first set of forward drive speeds selectable by shifting of said transmission;

second gearing means forming a farming operation group between said shafts for coupling said shafts with each other through said transmission with a second set of forward drive speeds selectable by shifting of said transmission;

third gearing means forming a reverse drive group between said shafts for coupling said shafts with each other through said transmission with a set of reverse drive speeds selectable by shifting of said transmission;

a gear box receiving said transmission and said gear means;

a manual gear-selection lever operatively connected to said gearbox and shiftable in said pattern to select said drive speeds;

a servocontrol selector on said gear-selection lever for selecting amoung said groups; and a gear-shift mechanism on said gearbox and including:

an electrohydraulic control unit responsive to electrical signals from said servocontrol selector for selecting among said groups, a power-assisted servo unit hydraulically responsive to said control unit for operating said gearing means, and coupling means connecting said manual gear-selection lever to said transmission for manual selection of gears thereof.

2. A transmission system, especially for farm tractors, comprising:

a transmission shiftable in a standard H pattern connectable between an input shaft and an output shaft;

first gearing means forming a road travel group between said shafts for coupling said shafts with each other through said transmission with a first set of forward drive speeds selectable by shifting of said transmission;

second gearing means forming a farming operation group between said shafts for coupling said shafts with each other through said transmission with a second set of forward drive speeds selectable by shifting of said transmission;

third gearing means forming a reverse drive group between said shafts for coupling said shafts with each other through said transmission with a set of reverse drive speeds selectable by shifting of said transmission;

a gearbox receiving said transmission and said gearing means;

a manual gear-selection lever operatively connected to said gearbox and shiftable in said pattern to select said drive speeds;

a servocontrol selector on said gear-selection lever for selecting among said groups; and a gear-shift mechanism on said gearbox and including:

an electrohydraulic control unit responsive to electrical signals from said servocontrol selector for selecting among said groups, a power-assist servo unit hydraulically responsive to said control unit for operating said gearing means, and coupling means connecting said manual gear-selection lever to said transmission for manual selection of gears thereof.

said power-assist servo unit including a selector slide valve displaceable by a pressure medium between a middle position and opposite end positions and connected permanently with a pressure source, and said electrohydraulic control unit including a respective solenoid valve electrically operated by said servocontrol selector and hydraulically connected to said power-assist servo unit for shifting said slide valve into a respective one of said positions, each of said solenoid valves being thereby assigned to a respective one of said positions.

3. The transmission system defined in claim 2 wherein said power-assist servo unit further comprises a two-position shifting piston for engagement and disengagement of said road travel group and a three-position shifting piston for said farming operating group and said reverse group, said three-position shifting piston being connected to a control valve by a shifting lever and being displaceable by said control valve.

4. The transmission system defined in claim 3 wherein said power-assist servo unit comprises a command valve operatively connected with said two-position shifting piston and a respective pressure cut-off valve assigned to each end position of said two-position shifting piston, a command slide valve assigned to said three-position shifting piston, respective pressure cut-off valves assigned to each end position of said three-position shifting piston, and two-way valves connected to piston spaces of said three-position shifting piston for venting same in a middle position of said three-position shifting piston.

5. The transmission system defined in claim 4 wherein said selector slide valve has end annular spaces at opposite ends thereof and second, third, fourth, fifth, sixth, seventh, eighth, ninth, tenth and eleventh annular spaces between said end annular spaces, and a selector slider shiftable in said annular spaces, said command valve of said three-positionable shifting piston having first, second, third, fourth, fifth, sixth and seventh annular spaces, said command valve of said two-position shifting piston having first, second, third, fourth, fifth, and sixth annular spaces, said power-assist servo unit further comprising:

first ducts connecting said pressure source to said solenoid valves;

second ducts connecting said pressure source to said fourth and eighth annular spaces of said selector slide valve;

third ducts connecting two of said solenoid valves to said second and eleventh annular spaces;

a fourth duct connecting a third of said valves to said selector slide valve;

a fifth duct connecting said third annular space of said selector slide valve and a sixth duct connecting said seventh annular space of the selector slide valve to said seventh annular space of the command valve of said three-position shifting piston, to a fourth annular space of the command valve of said two-position shifting piston and to a second annular space of said control valve, said control valve having in addition, third, fourth, fifth, sixth and seventh annular spaces;

a seventh duct connecting said fourth annular space of said selector slide valve to said fifth annular space of the command valve of said two-position shifting piston;

an eighth duct connecting said fifth annular space of said selector slide valve to said fourth annular space of the command valve of said three-position piston and to the fifth annular space of said control valve;

a ninth duct connecting the ninth annular space of the selector slide valve to the sixth annular space of the control valve; and a tenth duct connecting said first annular space of said command valve of said two-position shifting piston to said seventh annular space of the control valve.

6. The transmission system defined in claim 5 wherein said power-assist servo unit further comprises:

an eleventh duct connecting a first end annular space of a cutoff valve of said two-position shifting piston to said first annular space of said command valve of said three-position shifting piston and to a third annular space of said two-position shifting piston;

a twelfth duct connecting said third annular space to the command valve of the two-position shifting position to a fourth annular space of a pressure cutoff valve thereof and the respective lateral inlets of both of said two-way valves;

a thirteenth duct connecting said sixth annular space of the command valve of said two-position shifting piston to the fourth annular space of the first-mentioned pressure cutoff valve of said two-position shifting piston;

a fourteenth duct connecting a third annular space of the first-mentioned pressure cutoff valve of said two-position shifting piston to a first annular space of said two-position shifting piston;

a fifteenth duct connecting a fourth annular space of the first-mentioned pressure cutoff valve to a second annular space of said two-position shifting piston;

a sixteenth duct connecting a first annular space of the second-mentioned pressure cutoff valve of the two-position shifting piston to a third right-side annular space of the two-position shifting piston;

a seventeenth duct connecting a third annular space of said second pressure cutoff valve to a first right-side annular space of said two-position shifting piston;

an eighteenth duct connecting a fourth annular space of said second pressure cutoff valve to a second right-side annular space of said two-position shifting piston;

a nineteenth duct connecting a third annular space of the command valve to said three-position shifting piston to said second annular space of a second pressure cutoff valve thereof;

a twentieth duct connecting said sixth annular space of the command valve of said three-position shifting piston to a second annular space of the first pressure cutoff valve of said three-position shifting piston;

a twenty-first duct connecting a lateral inlet of one of said two-way valves to a third annular space of said control valve;

a twenty-second duct connecting a lateral inlet of the other two-way valve to a fourth annular space of said control valve;

a twenty-third duct connecting a third annular space of said first pressure cutoff valve of said three-position shifting piston to a left annular space of said shifting piston; and a twenty-fourth duct connecting a third annular space of said second pressure cutoff valve of said three-position shifting piston to a right annular space of said shifting piston, said two-position shifting piston having a groove engaging a lever rigidly connected to a first hollow shaft so that when said two-position shifting piston is displaced, said hollow shaft is rotated into two defined end positions, said three-position shifting piston having a groove engaging another lever displacing a second shaft into three defined positions including two extreme positions corresponding to the farming operation group and the reverse group and an intermediate position corresponding to the road travel group.

7. The transmission system defined in claim 6 wherein said solenoid valves, said selector slide valve, said control valve, said command valves and said pressure cutoff valves are all located in a common control case flanged together with a cover for oil channels, said two-way valves and a servocontrol case on said gear box, said control unit case including shifting pistons for power assist group shifting.

8. The transmission system defined in claim 7, further comprising mechanically-operable emergency actuators on an exterior of said control unit case, secured against unintentional operation of a lock and adapted to displace said selector slide valve in the event of a power failure.

9. The transmission system defined in claim 7 wherein said transmission is provided with a mechanical-electrical starter safeguard having a shaft formed with a surface, a hollow shaft slotted up to said surface and a sensor pin cooperating with a switch located in the slot of said hollow shaft and protruding through said slot through said surface in a middle position of the transmission.

10. The transmission system defined in claim 7 wherein between said control unit case and said cover a sealing plate is disposed, at a definite distance from an outer edge of said sealing plate on sealing surfaces, relief channels extending circularly being formed and being connected to an interior of the gear box.

11. The transmission system defined in claim 7 wherein said servocontrol case has an overflow passage to a sump of a gear box in the form of an enlarged passage for one of said shafts.

* * * * *